(12) United States Patent
Elazhary et al.

(10) Patent No.: US 11,675,192 B2
(45) Date of Patent: Jun. 13, 2023

(54) HYBRID COUPLING DIFFRACTIVE OPTICAL ELEMENT

(71) Applicant: Meta Platforms Technologies, LLC, Menlo Park, CA (US)

(72) Inventors: Tamer Mohamed Tawfik Ahmed Mohamed Elazhary, Redmond, WA (US); Michael Patrick Schaub, Redmond, WA (US); Byron Taylor, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 116 days.

(21) Appl. No.: 16/800,886

(22) Filed: Feb. 25, 2020

(65) Prior Publication Data
US 2021/0173210 A1 Jun. 10, 2021

Related U.S. Application Data

(60) Provisional application No. 62/944,873, filed on Dec. 6, 2019.

(51) Int. Cl.
*G02B 27/01* (2006.01)
*G02B 27/42* (2006.01)
*F21V 8/00* (2006.01)

(52) U.S. Cl.
CPC ....... *G02B 27/0172* (2013.01); *G02B 6/0016* (2013.01); *G02B 27/4205* (2013.01);
(Continued)

(58) Field of Classification Search
CPC ............ G02B 27/0172; G02B 27/4205; G02B 6/0016; G02B 2027/0138;
(Continued)

(56) References Cited

U.S. PATENT DOCUMENTS

2017/0235144 A1  8/2017  Piskunov et al.
2019/0079275 A1*  3/2019  Lai ..................... G02B 27/4222
(Continued)

FOREIGN PATENT DOCUMENTS

EP      1542062 A1      6/2005
KR   20170096380 A      8/2017
WO   20030010587 A1     2/2003

OTHER PUBLICATIONS

Translation KR-20170096380-A (Year: 2017).*
(Continued)

*Primary Examiner* — Thomas K Pham
*Assistant Examiner* — Henry A Duong
(74) *Attorney, Agent, or Firm* — Shumaker & Sieffert, P.A.

(57) ABSTRACT

A multi-functional diffractive optical element (DOE) for redirecting light into a waveguide and providing higher order aberration correction is described. The multi-functional DOE may be positioned on, connected to, adjacent to, or within a waveguide, and in some examples is positioned at, or near, the exit pupil of the projector lens. In an example, a head-mounted display (HMD) is configured to output artificial reality content, comprising a waveguide configured to receive input light and configured to output the received input light to an eyebox. The HMD further comprises a projector configured to input light into the waveguide, the projector comprising a display, a projection lens, and a multi-functional diffractive optical element (DOE) configured to redirect light from the projector into the waveguide and provide higher order aberration correction of the light from the display.

21 Claims, 12 Drawing Sheets

(52) U.S. Cl.
CPC .............. *G02B 2027/0138* (2013.01); *G02B 2027/0178* (2013.01)

(58) Field of Classification Search
CPC .... G02B 2027/0178; G02B 2027/0116; G02B 2027/014; G02B 27/0093; G02B 27/0056; G02B 5/18
USPC ........................................................ 359/558
See application file for complete search history.

(56) References Cited

U.S. PATENT DOCUMENTS

| | | | | |
|---|---|---|---|---|
| 2019/0285902 A1* | 9/2019 | Ouderkirk | .......... | G02B 27/0172 |
| 2019/0377185 A1* | 12/2019 | Cheng | .................. | G03B 21/208 |
| 2020/0033530 A1* | 1/2020 | Colburn | ............. | G02B 27/4205 |
| 2020/0209638 A1* | 7/2020 | Osmanis | .............. | H04N 13/395 |
| 2021/0072553 A1* | 3/2021 | Danziger | ........... | G03B 21/2073 |

OTHER PUBLICATIONS

International Search Report and Written Opinion of International Application No. PCT/US2020/058626, dated Feb. 25, 2021, 10 pp.
Van Laere et al., "Compact Focusing Grating Couplers Between Optical Fibers and Silicon-on-Insulator Photonic Wire Waveguides," Optical Society of America, 2006, 3 pp. (Applicant points out, in accordance with MPEP 609.04(a), that the year of publication, 2006, is sufficiently earlier than the effective U.S filing date, so that the particular month of publication is not in issue.).
International Preliminary Report on Patentability for International Application No. PCT/US2020/058626, dated Jun. 16, 2022, 9 pages.

* cited by examiner

HYBRID COUPLING DIFFRACTIVE OPTICAL ELEMENT

This application claims the benefit of U.S. Provisional Application No. 62/944,873, filed Dec. 6, 2019, the entire content of which is incorporated herein by reference.

TECHNICAL FIELD

This disclosure generally relates to optical elements and optical systems implemented in various types of electronic systems and devices.

BACKGROUND

Optical devices, including head-mounted display (HMD) devices, provide visual information to a user. For example, head-mounted displays are used for virtual reality (VR) and augmented reality (AR) operations. A head-mounted display often includes an electronic image source and an optical assembly.

In some augmented reality applications, a virtual image including virtual objects is presented to a user via a display and combined with real-world objects. In some applications, the virtual image is presented to the user via a partially transparent and partially reflective combiner and overlaps a real-world scene directly viewable by the user through the combiner. In other applications, the real-world objects are captured by image capture devices and presented to the user via a display. In some applications, virtual objects and image captures of real-world objects may be presented to a user by a projector.

SUMMARY

In general, the present disclosure is directed to a multi-functional diffractive optical element (DOE) and a projector including a multi-function diffractive optical element (DOE). The multi-functional DOE can be an input coupler to redirect light from a projector into a waveguide while at the same time the multi-functional DOE can be an element of a projector lens. The multi-functional DOE may be positioned on, connected to, adjacent to, or within a waveguide, and in some examples is positioned at, or near, the exit pupil of the projector lens. As such, the multi-functional DOE can improve the performance of the projector lens, e.g., the multi-functional DOE can improve image forming performance of the projector lens, the multi-functional DOE can enable shortening of the projector lens by enabling removal of refractive elements and/or redesign of the projector lens while maintaining the projector lens image forming performance, or both.

In one example, this disclosure is directed to a head-mounted display (HMD) configured to output artificial reality content, comprising a waveguide configured to receive input light and configured to output the received input light to an eyebox. The HMD further comprises a projector configured to input light into the waveguide, the projector comprising a display, a projection lens, and a multi-functional diffractive optical element (DOE) configured to redirect light from the projector into the waveguide.

In another example, this disclosure is directed to a multi-functional diffractive optical element (DOE) comprising a linear phase profile and a higher order aberration correcting phase profile, wherein the higher order aberration correcting phase profile is configured to provide higher order aberration correction of light incident on the multi-functional DOE.

In a further example, this disclosure is directed to a method of projecting an image, the method comprising emitting light from an electronic display and collimating the emitted light via a projection lens. The method further comprises redirecting the collimated emitted light via a multi-functional DOE, and compensating for the aberrations of the projection lens via the multi-functional DOE.

Thus, the disclosed examples provide a DOE that is multi-functional and can function as an input coupler by redirecting light into a waveguide and that can function as a lens element of a projector lens to improve the image forming performance of the projector lens thereby enabling the length of the projector lens to be reduced.

DETAILED DESCRIPTION

In general, the present disclosure is directed to a multi-functional diffractive optical element (DOE) and a projector including a multi-functional DOE. The multi-functional DOE may include structures on the order of the wavelength of visible light or smaller that act as coupler to redirect light from a projector into a waveguide while at the same time functioning as a lens element improving the imaging quality of a projector lens and/or the projector. In some examples, the multi-functional DOE may be a transmissive grating that induces correction to aberrations of the projector after transmission through the multi-functional DOE, such as a surface relief grating inducing an aberration correction via spatial variations of the physical surface profile of one or both surfaces of the grating, a volume grating such as a holographic optical element that induces an aberration correction via spatial variations of the index of refraction in the material of the multi-functional DOE, or the like. In some examples, the multi-functional DOE may include reflective structures on the order of the wavelength of light or smaller that induce a correction to aberrations of the projector lens after reflection from the multi-functional DOE into the waveguide, such as a surface relief reflective grating imparting an aberration correction via spatial variations of the physical surface profile of the reflective surface of the grating, a volume reflective grating, for example a reflective Bragg grating, that imparts a phase profile via spatial variations of the index of refraction in the bulk of the material of the multi-functional DOE, or the like. The DOE may be positioned on, connected to, adjacent to, or within a waveguide, and in some examples is positioned at, or near, the exit pupil of the projector lens. In some examples, the DOE may be positioned at or near a surface of the waveguide opposite the projector. As such, the aberration correction of the DOE can improve the performance of the projector lens, e.g., the DOE can improve image forming performance of the projector lens, the DOE can enable shortening of the projector lens by enabling removal of refractive elements and/or redesign of the projector lens while maintaining the projector lens image forming performance, or both.

Figure 1:
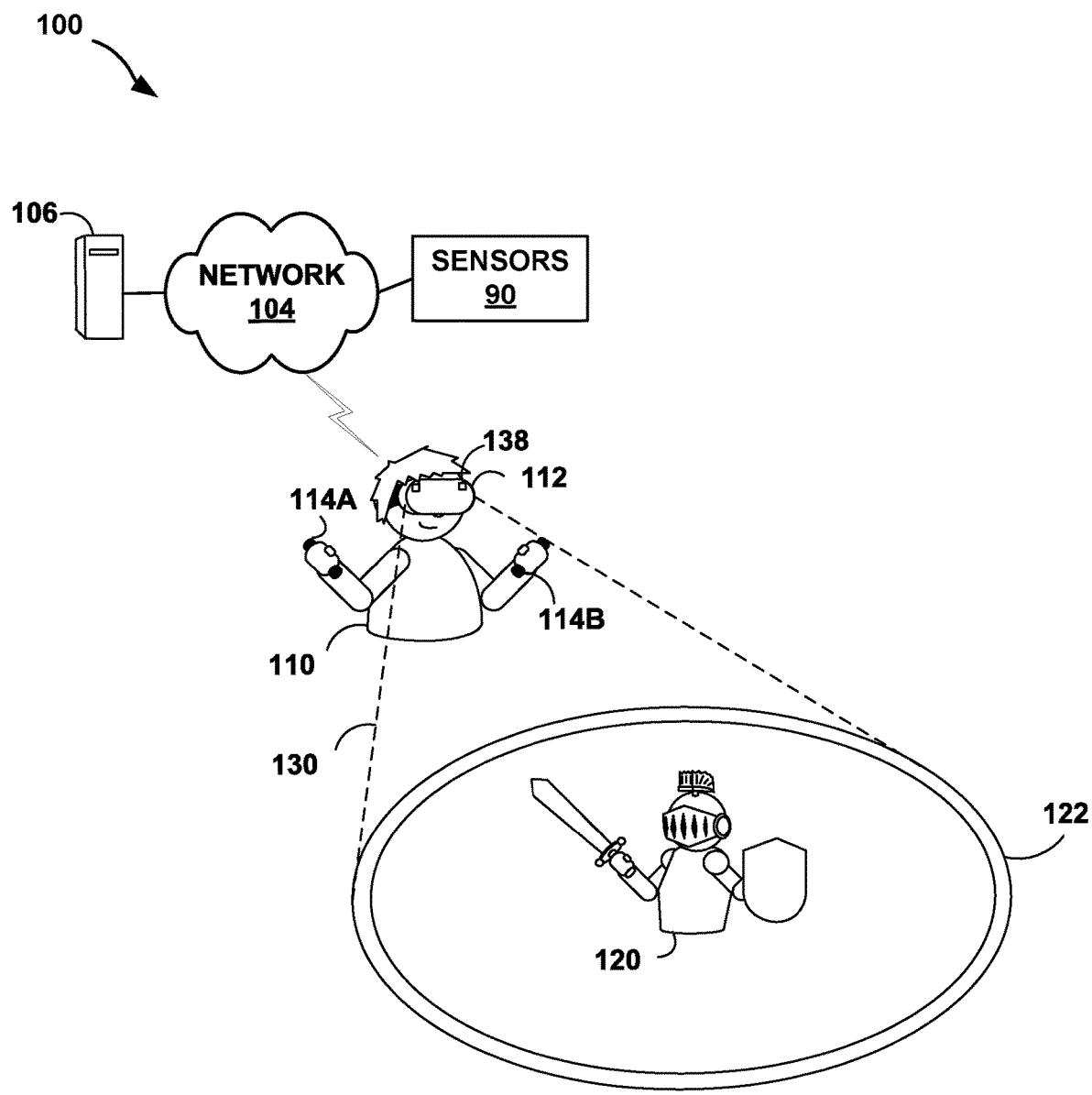
FIG. 1 is an illustration depicting an example artificial reality system that includes a multi-functional diffractive optical element (DOE), in accordance with the techniques described in this disclosure.

FIG. 1 is an illustration depicting an example artificial reality system includes an angularly selective diffusive combiner, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content overlaid with real-world objects in a scene, the HMD 112 can include a projector and waveguide to translate the image formed by the projector to a location viewable by a user's eye or eyes. The projector may include a display and a projector lens. The waveguide may include an input grating coupler to redirect light from the projector into the waveguide, and the waveguide may "trap" the light via total internal reflection (TIR). For example, the projector lens may include a multi-functional DOE that may be a diffraction grating that functions as both a grating coupler to redirect light into the waveguide and as a lens element improving the imaging quality of the projector lens. The waveguide may include an output grating to redirect light out of the waveguide, for example, towards an eyebox. In some examples, the projector lens may collimate light from the display, e.g., the display may be located substantially at a focal point of the projector lens. The grating coupler may redirect the collimated light from the display into the waveguide, and the light may propagate within the waveguide via TIR at the surfaces of the waveguide. The waveguide may include an output structure, e.g. holes, bumps, dots, a HOE, a DOE, etc., to redirect light from the waveguide to a user's eye, which focuses the collimated light from the display of the projector on the user's retina, thereby reconstructing the display image on the user's retina. In some examples, the TIR of the waveguide functions as a mirror and does not significantly affect the image quality of the display, e.g. the user's view of the display is equivalent to viewing the display in a mirror.

Figure 2A:
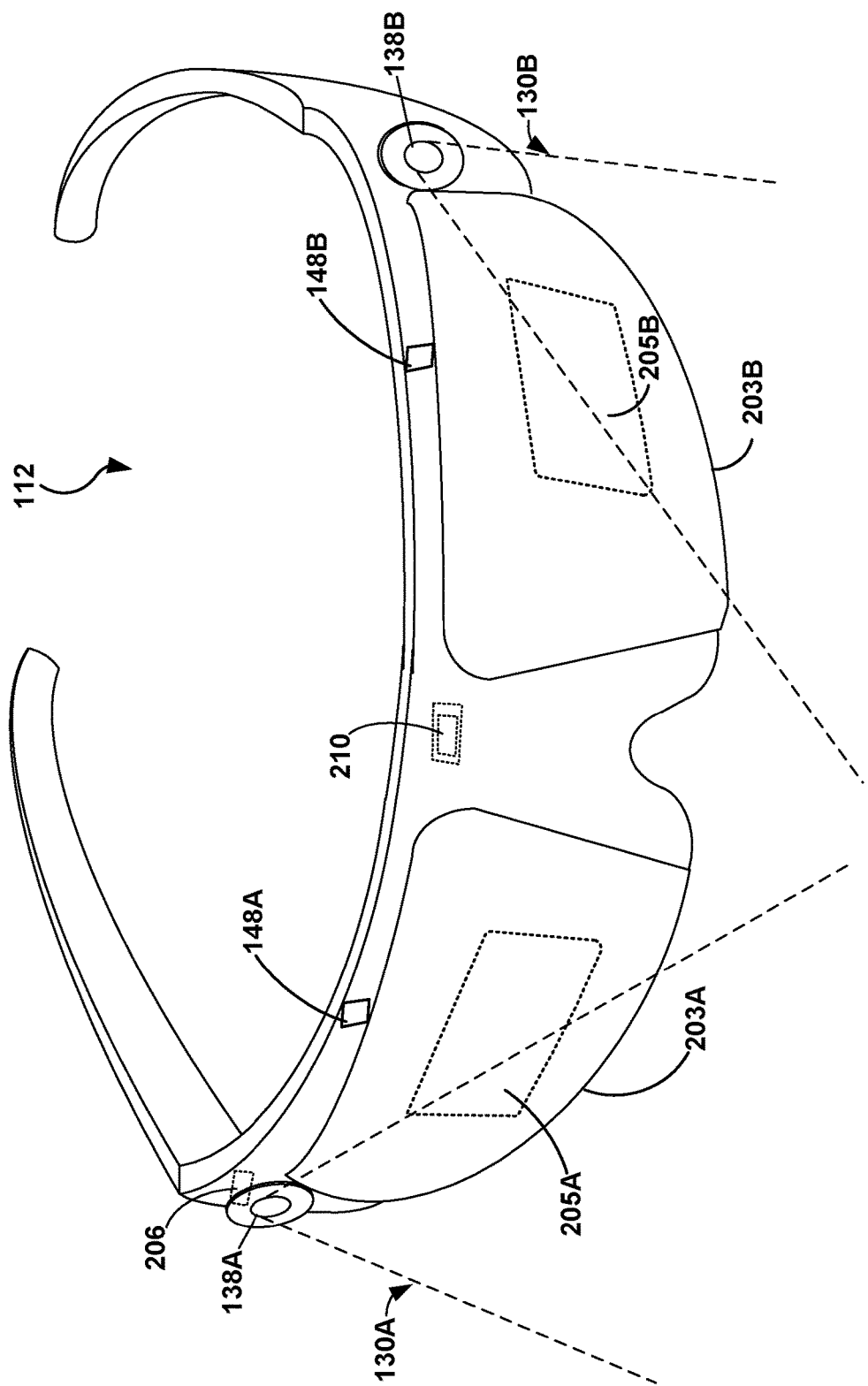
FIG. 2A is an illustration depicting an example HMD that includes a multi-functional DOE, in accordance with techniques described in this disclosure.

FIG. 2A is an illustration depicting an example HMD 112 that includes a multi-functional DOE, in accordance with techniques described in this disclosure. HMD 112 of FIG. 2A may be an example of HMD 112 of FIG. 1. As shown in FIG. 2A, HMD 112 may take the form of glasses. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2A includes one or more waveguides 203A and 203B (collectively, "waveguides 203") and one or more waveguide output structures 205A and 205B (collectively, "waveguide output structures 205") configured to redirect light out of the waveguides 205A and 205B. In the example shown, projectors 148A and 148B (collectively, "projectors 148") may input light, e.g. collimated light, into the waveguides 203A and 203B via a grating coupler (not shown) that redirects light from the projectors 148 into the waveguides 203 such that the light is "trapped" via total internal reflection (TIR) within the waveguide. For example, projectors 148A and 148B may include a display and a projector lens. The projector lens may include a multi-functional DOE that may be a diffraction grating that functions as both a grating coupler to redirect light into the waveguide and as a lens element improving the imaging quality of the projector lens. In some examples, the waveguides 203 may be transparent and alternatively may be referred to as "windows 203" hereinafter. In some examples, the known orientation and position of windows 203 relative to the front frame of HMD 112 is used as a frame of reference, also referred to as a local origin, when tracking the position and orientation of HMD 112 for rendering artificial reality content according to a current viewing perspective of HMD 112 and the user. In some examples, the projectors 148 can provide a stereoscopic display for providing separate images to each eye of the user.

In the example shown, the waveguide output structures 205 cover a portion of the windows 203, subtending a portion of the field of view 130 viewable by a user 110 through the windows 203. In other examples, the waveguide output structures 205 can cover other portions of the windows 203, or the entire area of the windows 205.

As further shown in FIG. 2A, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on the angularly selective diffusive combiners 205.

Figure 2B:
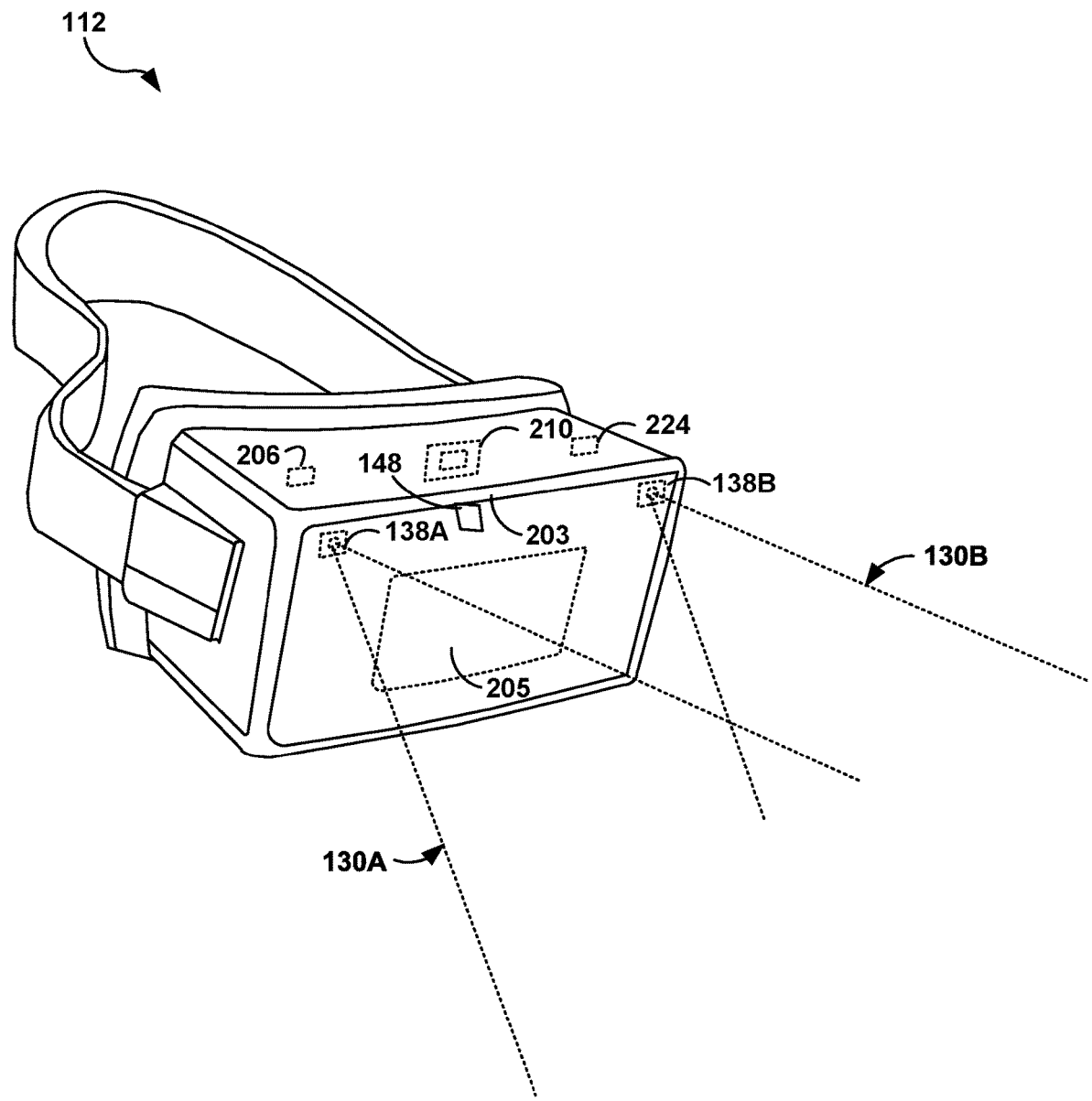
FIG. 2B is an illustration depicting another example HMD that includes a multi-functional DOE, in accordance with techniques described in this disclosure.

FIG. 2B is an illustration depicting another example HMD that includes a multi-functional DOE. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes a waveguide 203 (or, alternatively, a window 203) configured to present artificial reality content to the user via a waveguide output structure 205. In the example shown, projector 148 may input light, e.g. collimated light, into the waveguide 203 via a grating coupler (not shown) that redirects light from the projector 148 into the waveguide 203 such that the light is "trapped" via total internal reflection (TIR) within the waveguide. For example, projectors 148 may include a display and a projector lens. The projector lens may include a multi-functional DOE that functions as both a grating coupler to redirect light into the waveguide and as a lens element improving the imaging quality of the projector lens. In some examples, the known orientation and position of waveguide 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

Figure 3:
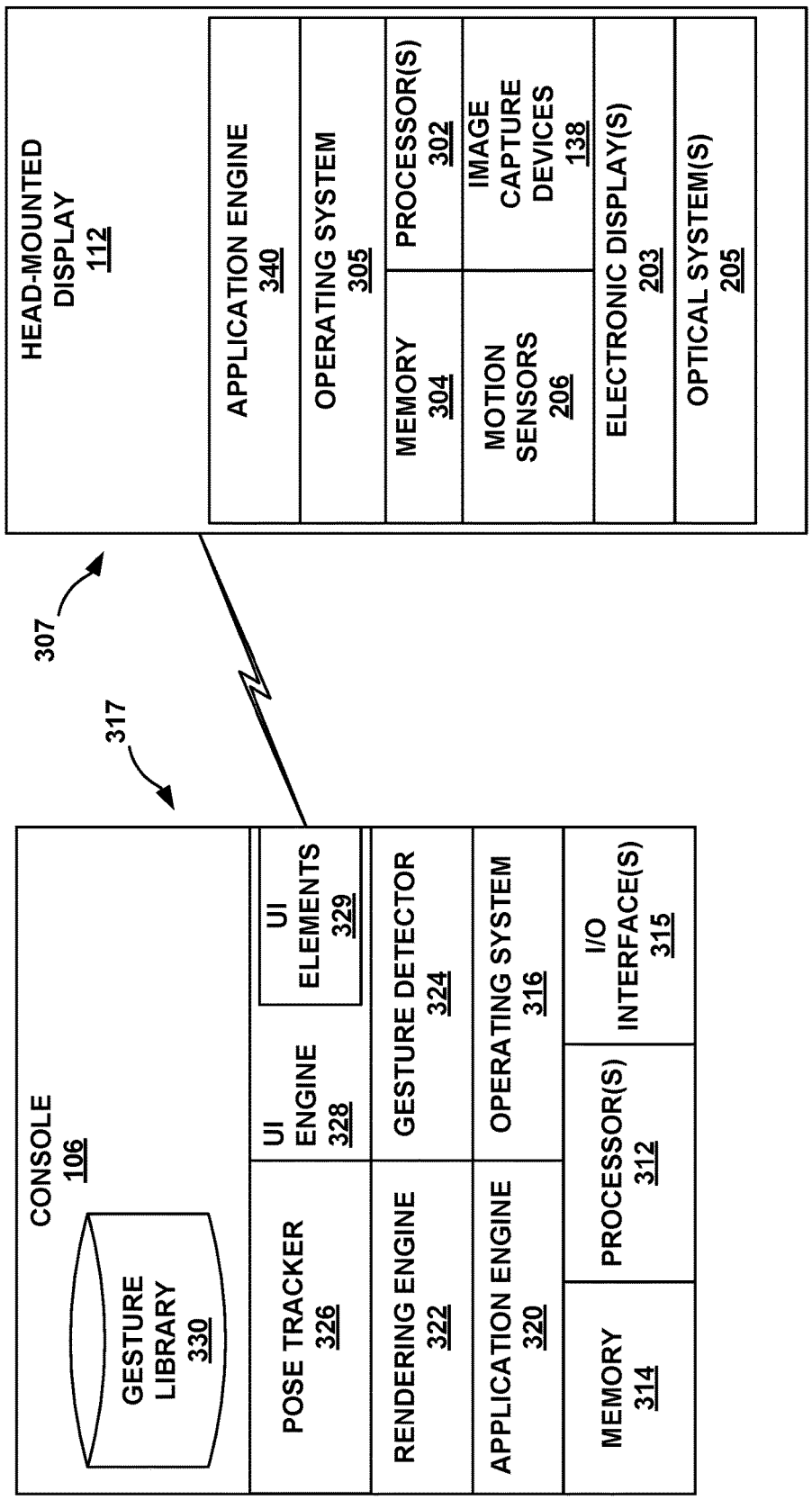
FIG. 3 is a block diagram showing example implementations of a console and an HMD of the artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206, image capture devices 138, and, in some examples, optical system 205. In some examples, processors 302 and memory 304 may be separate, discrete components. In other examples, memory 304 may be on-chip memory collocated with processors 302 within a single integrated circuit.

In some examples, optical system 205 may include projectors and waveguides for presenting virtual content to a user, as described above with respect to FIGS. 2A-2B. For example, optical system 205 may include a projector including electronic display 203 and a projection lens. The projection lens may further include a multi-functional DOE that functions as both a grating coupler to redirect light into a waveguide and as a lens element improving the imaging quality of the projector lens.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
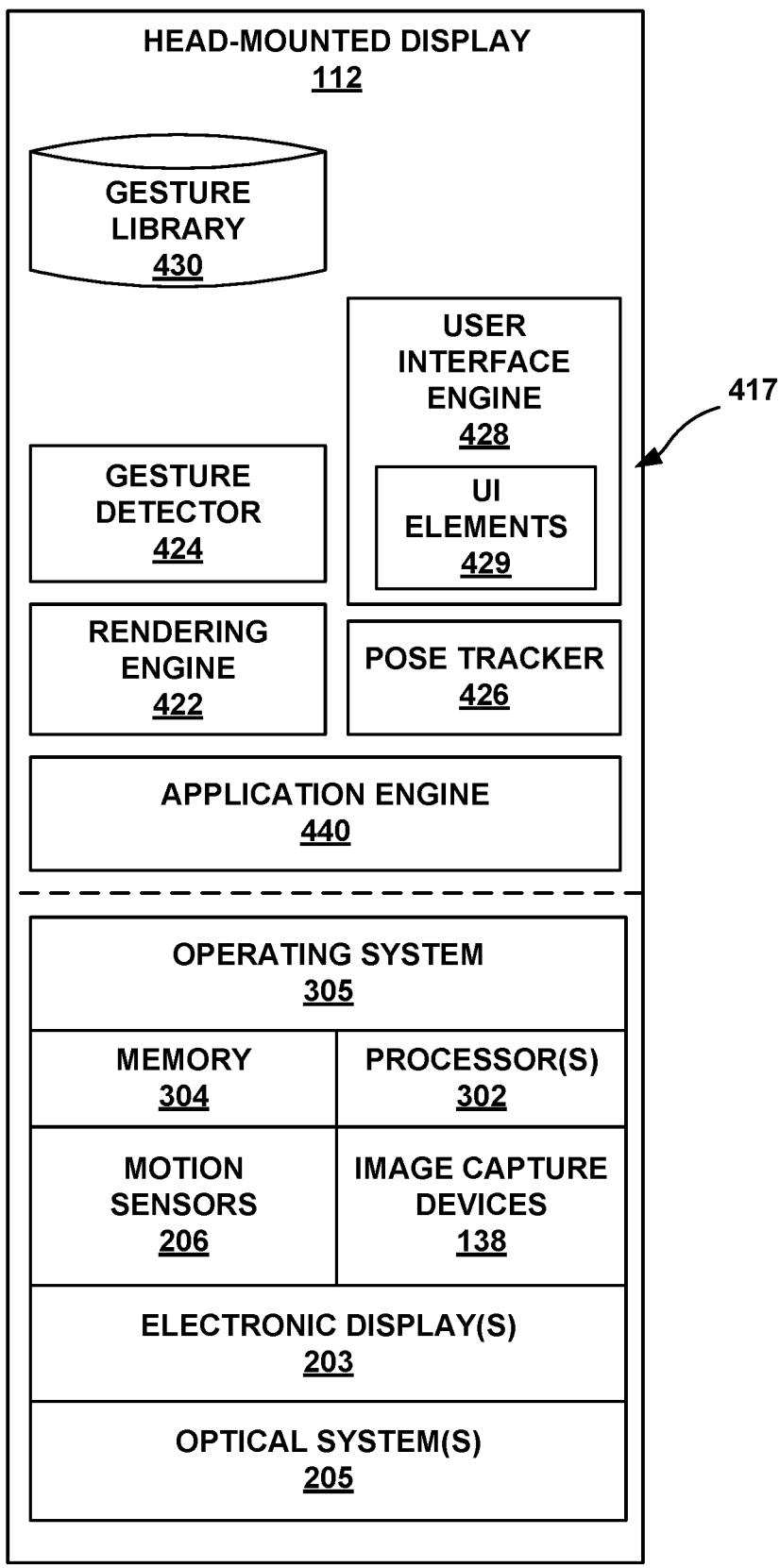
FIG. 4 is a block diagram depicting an example HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 203, varifocal optical system(s) 205, motion sensors 206, and image capture devices 138.

In some examples, optical system 205 may include projectors and waveguides for presenting virtual content to a user, as described above with respect to FIGS. 2A-2B. For example, optical system 205 may include a projector including electronic display 203 and a projection lens. The projection lens may further include a multi-functional DOE that functions as both a grating coupler to redirect light into a waveguide and as a lens element improving the imaging quality of the projector lens.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
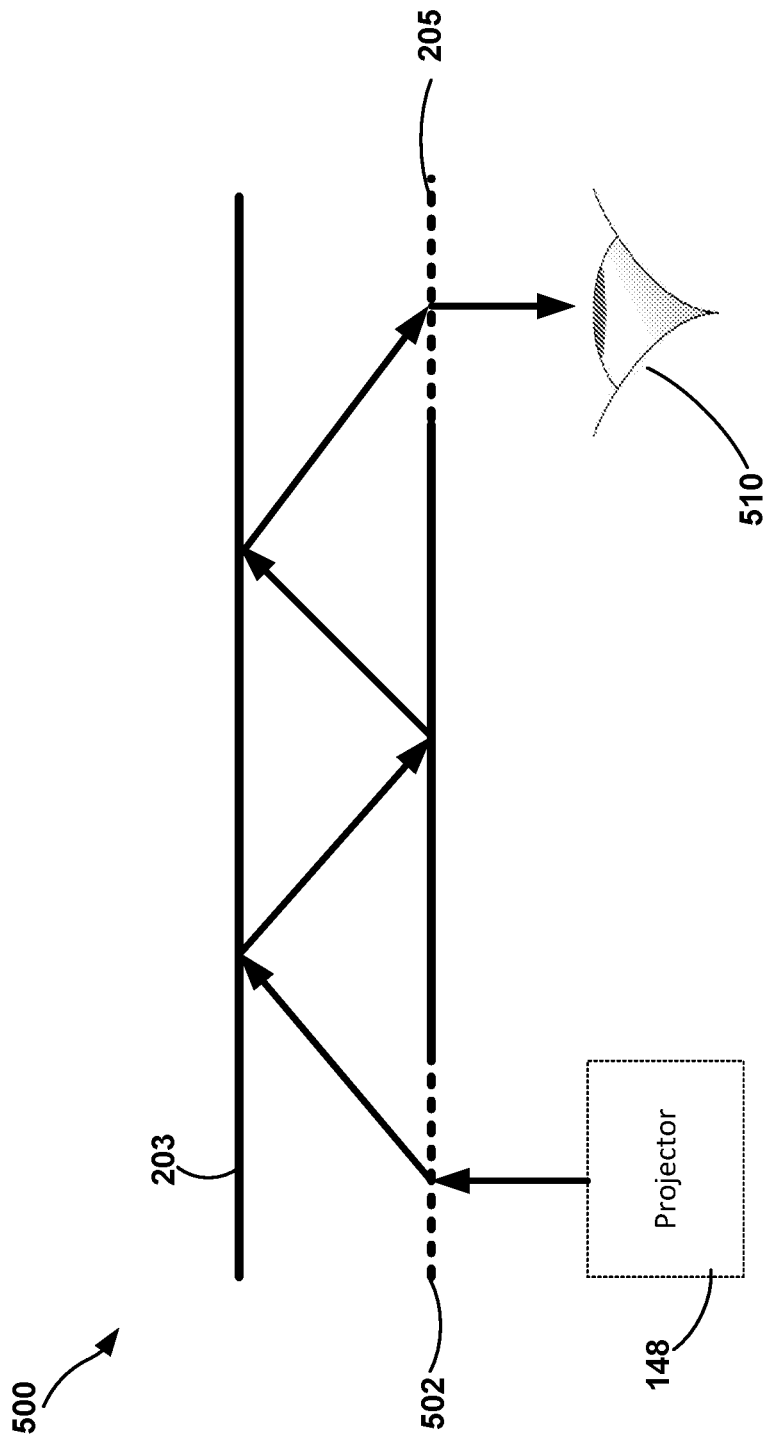
FIG. 5 is an illustration depicting an example artificial reality system that includes a multi-functional DOE, in accordance with the techniques described in this disclosure.

FIG. 5 is an illustration depicting a cross-sectional view of an example artificial reality system 500 that includes a multi-functional DOE 502, in accordance with the techniques described in this disclosure. In the example shown, the artificial reality system 500 includes a user's eye 510, a projector 148, and a waveguide 203. The waveguide 203 includes a waveguide output structure 205 disposed on or adjacent to one portion of the waveguide 203, and a multi-functional DOE 502 disposed on or adjacent to a different portion of the waveguide 203.

In the example shown, projector 148 is configured to project light towards a major surface of the waveguide 203 at an angle (e.g., a substantially perpendicular angle) to the major surface of the waveguide 203. Projector 148 is configured to substantially collimate light from the projector display.

In the example shown, multi-functional DOE 502 is substantially transparent for light 504 from projector 148 and is positioned relative to projector 148 such that substantially all of the light from projector 148 is incident on multi-functional DOE 502. Multi-functional DOE 502 is positioned adjacent to a major surface of the waveguide 203. In some examples, multi-functional DOE 502 may be a part of the major surface of the waveguide 203, or may be positioned within the waveguide 203. Multi-functional DOE 502 is configured to redirect the light from projector 148 at an angle less than the critical angle of the waveguide 203 such that the light will TIR within waveguide 203. Multi-functional DOE 502 is further configured to function as a lens or lens element, for example, having spherical focusing power or otherwise configured to shape an incident wavefront. For example, multi-functional DOE 502 may be configured as a lens element of a multi-element projection lens.

In some examples, multi-functional DOE 502 may be a diffractive optical element, e.g. a diffractive grating, a phase plate, a phase grating, a ruled grating, a holographic grating, and the like. Multi-functional DOE 502 may be made from any suitable material, for example, glass, plastic or polymeric material such as poly(methyl methacrylate) (PMMA), polycarbonate (PC), poly(ethylene terephthalate) (PET), a metamaterial or metasurface, or any suitable material having substantial transparency in the visible and/or near IR wavelength spectrum. In some examples, multi-functional DOE 502 may be a reflective surface grating made from any suitable material such as glass, plastic or polymeric material such as poly(methyl methacrylate) (PMMA), polycarbonate (PC), poly(ethylene terephthalate) (PET), or any suitable substrate material, and coating with any suitable material having substantial reflectivity in the visible and/or near IR wavelength spectrum, e.g. aluminum, silver, copper, etc.

In some examples, multi-functional DOE 502 may include a planar substrate, and in some examples multi-functional DOE 502 may include a curved substrate such that DOE 502 includes focusing power. In some examples, multi-functional DOE 502 may include spatially varying structures that impart a spatially varying phase delay on an incident wave front via physical height/depth differences or refractive index differences, or both. In some examples, the spatially varying phase delay may be a superposition of characteristic phase delay patterns. For example, multi-functional DOE 502 may include a blaze grating pattern configured to redirect substantially collimated light into waveguide 203 superimposed with an arbitrary phase delay pattern that may shape the wave form of the incident light, for example, to correct for any order of aberrations.

In some examples, multi-functional DOE 502 may be polarization sensitive. For example, multi-functional DOE 502 may be a transmissive or reflective polarizing volume hologram (PVH), a liquid crystal filled surface relief grating (LC-SRG), an anisotropic polymer film (APF), a transmissive or reflective holographic phase dispersed liquid crystal (H-PDLC), a Pancharatnam-Berry Phase lens or grating (PBP), and the like.

In the example shown, waveguide output structure 205 is positioned adjacent to a major surface of the waveguide 203. In some examples, waveguide output structure 205 may be a part of the major surface of the waveguide 203, or may be positioned within the waveguide 203. Waveguide output structure 205 is configured to redirect light from the waveguide out of the waveguide and to the user's eye 510.

Figure 6:
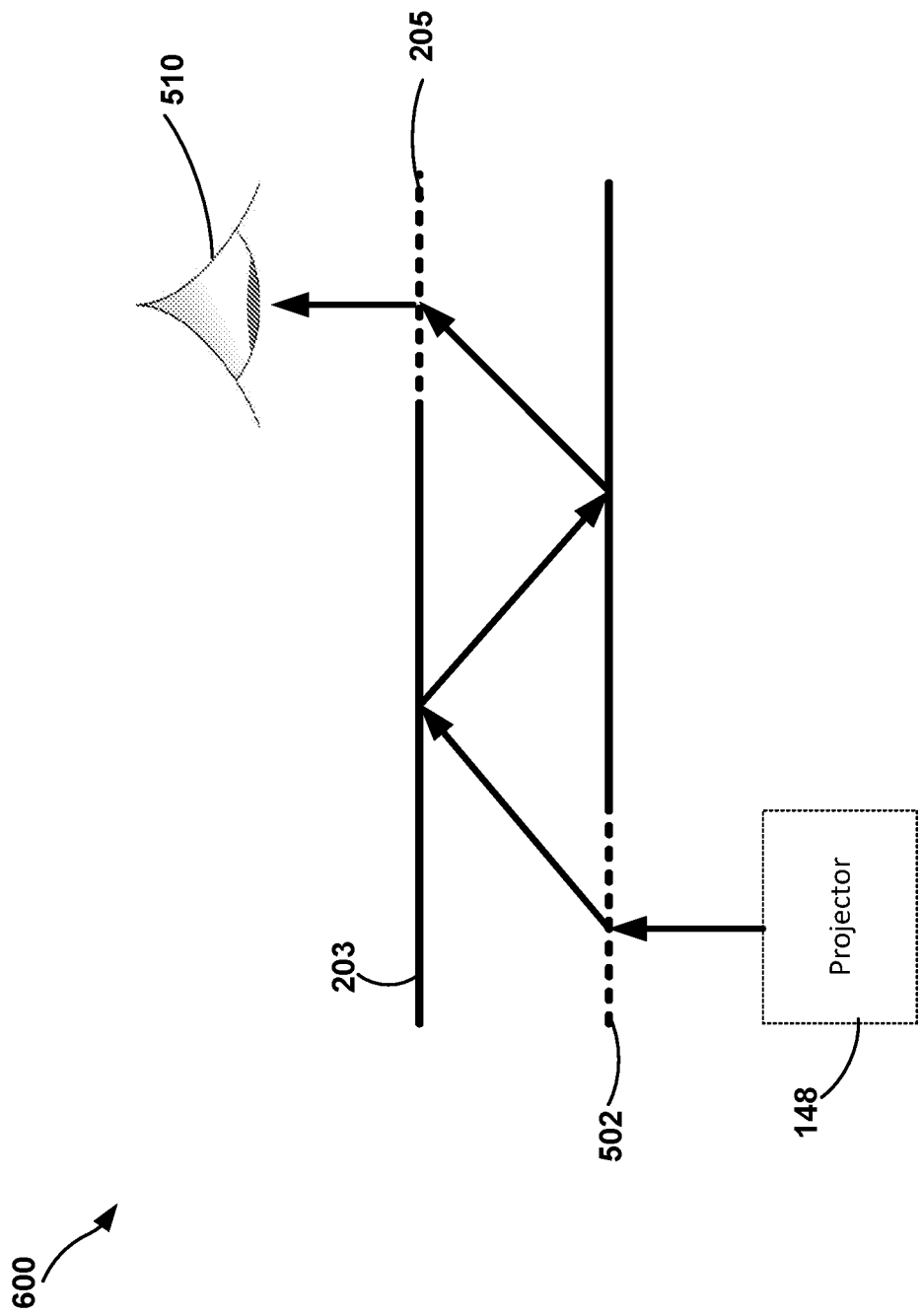
FIG. 6 is an illustration depicting another example artificial reality system that includes a multi-functional DOE, in accordance with the techniques described in this disclosure.

FIG. 6 is an illustration depicting a cross-sectional view of another artificial reality system 600 that includes a multi-functional DOE 502, in accordance with the techniques described in this disclosure.

Figure 7:
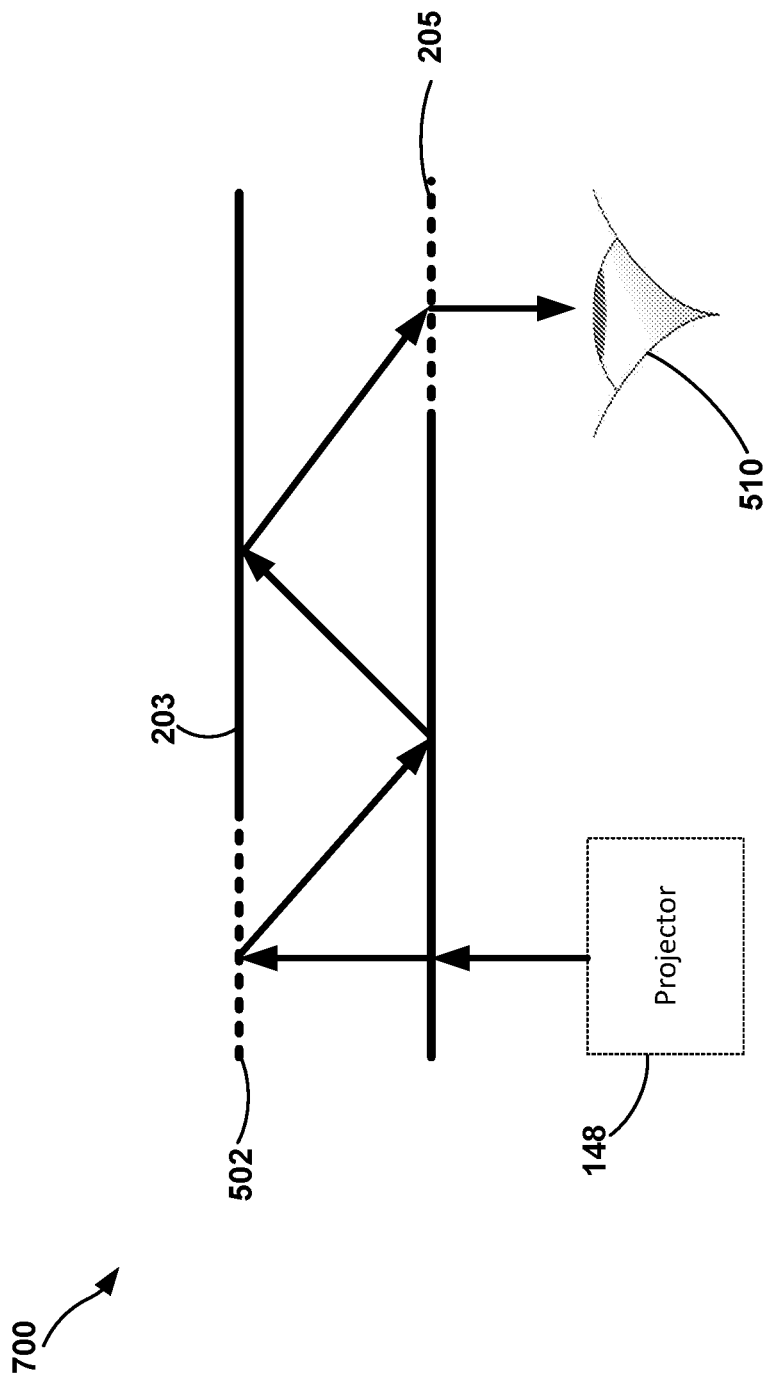
FIG. 7 is an illustration depicting another example artificial reality system that includes a multi-functional DOE, in accordance with the techniques described in this disclosure.

The artificial reality system 600 is similar to the artificial reality system 500 of FIG. 5, except user's eye 510 and waveguide output structure 205 are on the opposite surface of the waveguide 203 from the projector 148 and multi-functional DOE 502. As illustrated in FIGS. 6-7, output waveguide structure 205 and user's eye 510 can be on, or adjacent to, either side of the waveguide 203 from the projector 148 and multi-functional DOE 502.

FIG. 7 is an illustration depicting a cross-sectional view of another artificial reality system 700 that includes a multi-functional DOE 502, in accordance with the techniques described in this disclosure.

The artificial reality system 700 is similar to the artificial reality system 500 of FIG. 5, except multi-functional DOE 502 is on, or adjacent to, the opposite surface of waveguide 203 from the projector 148. In the example shown, light from the projector 148 is incident substantially perpendicular to a surface of waveguide 203 and waveguide 203 is substantially transparent to visible and/or near IR light. The light propagates along the thickness direction in the material of waveguide 203 and is incident on multi-functional DOE 502. Multi-functional DOE 502 may be substantially reflective and may reflect and redirect the light from the projector into waveguide 203, as well as functioning as a lens or lens element of the projector 148.

Figure 8:
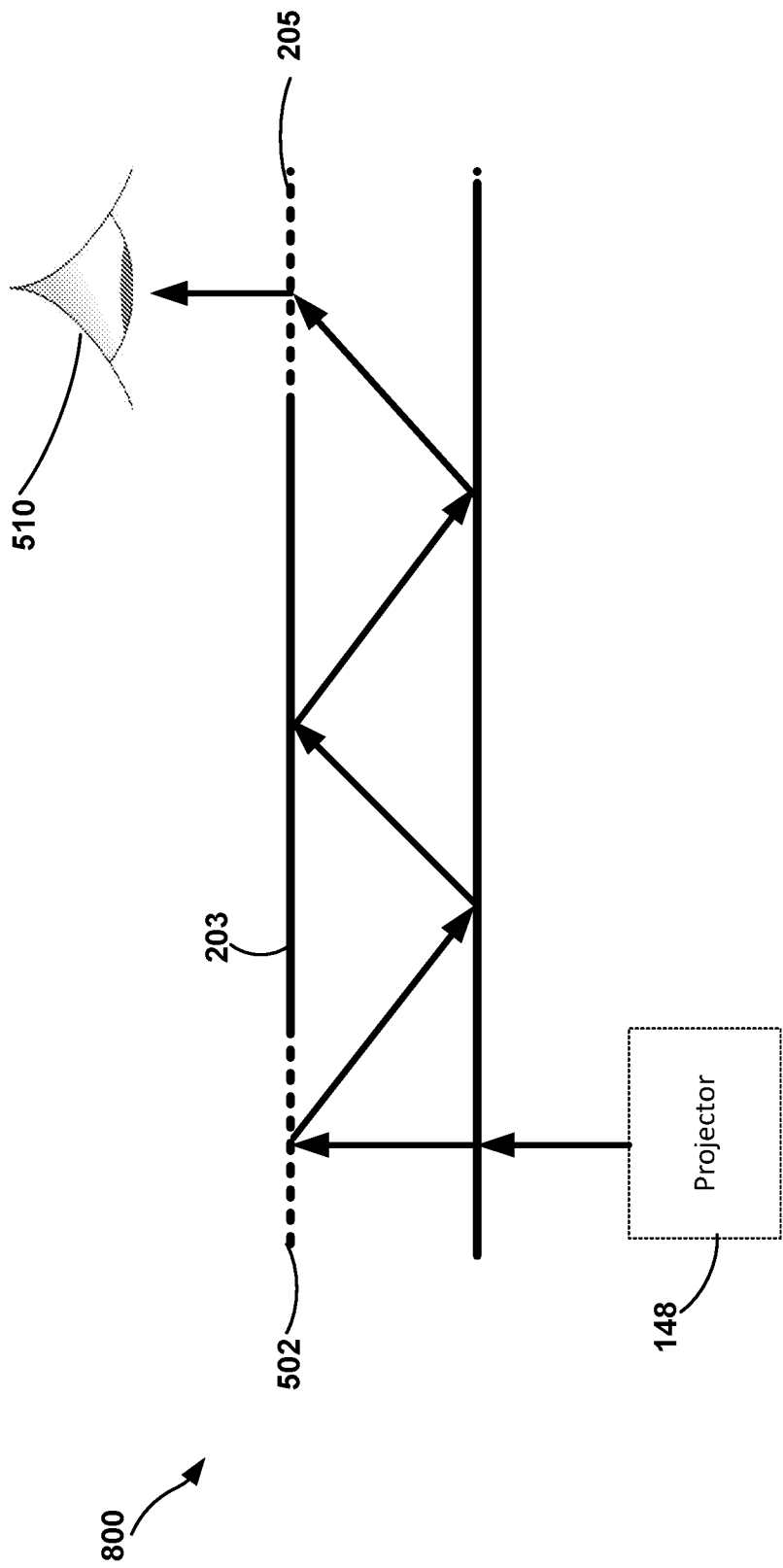
FIG. 8 is an illustration depicting another example artificial reality system that includes a multi-functional DOE, in accordance with the techniques described in this disclosure.

FIG. 8 is an illustration depicting a cross-sectional view of another artificial reality system 800 that includes a multi-functional DOE 502, in accordance with the techniques described in this disclosure.

The artificial reality system 800 is similar to the artificial reality system 700 of FIG. 7, except user's eye 510 and waveguide output structure 205 are on the opposite surface of the waveguide 203 from the projector 148. As illustrated in FIGS. 7-8, output waveguide structure 205 and user's eye 510 can be on, or adjacent to, either side of the waveguide 203 from the projector 148 and/or multi-functional DOE 502.

Figure 9:
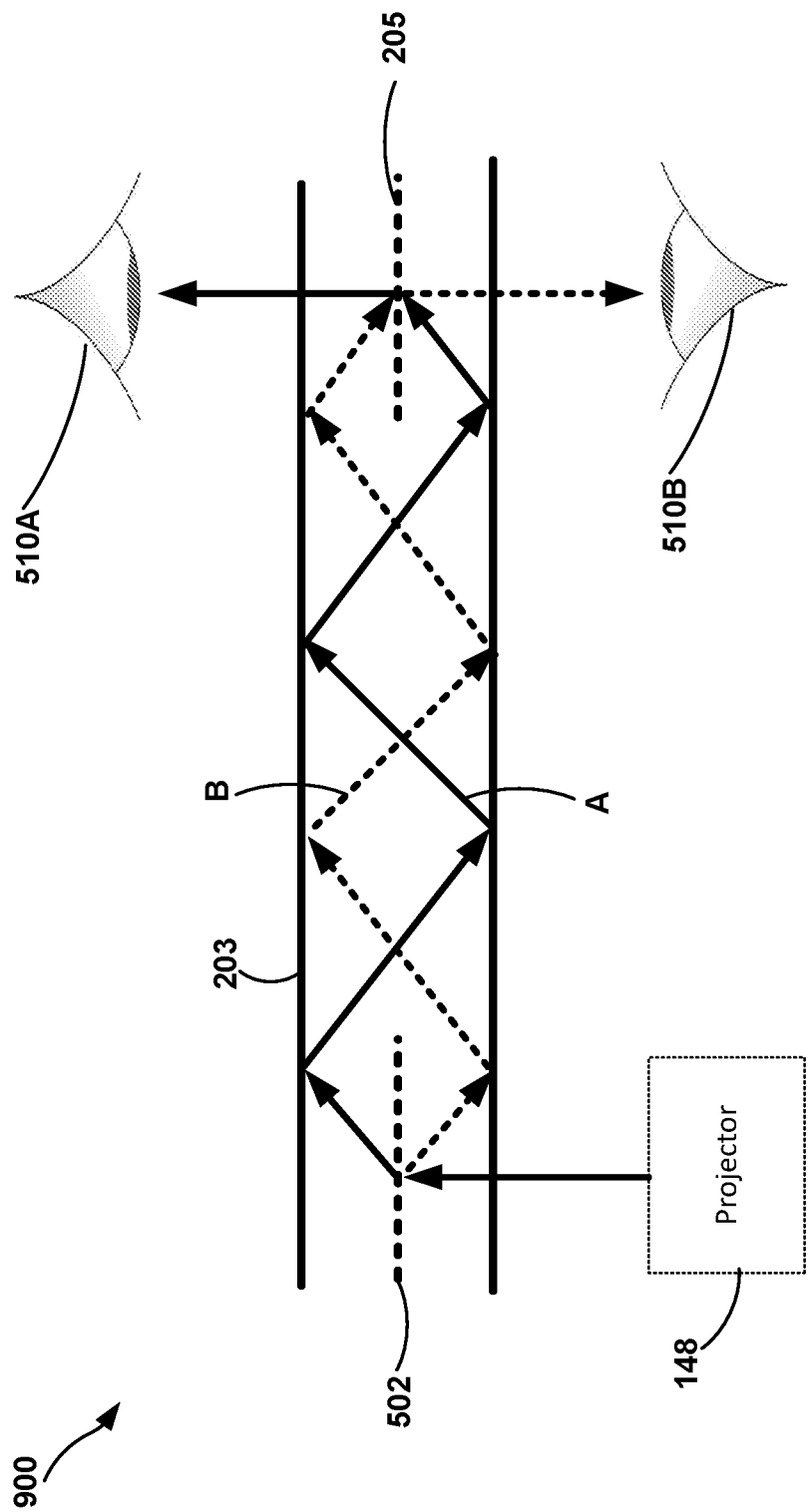
FIG. 9 is an illustration depicting another example artificial reality system that includes a multi-functional DOE, in accordance with the techniques described in this disclosure.

FIG. 9 is an illustration depicting a cross-sectional view of another artificial reality system 900 that includes a multi-functional DOE 502, in accordance with the techniques described in this disclosure.

In the example shown, multi-functional DOE 502 is positioned within waveguide 203, and waveguide output structure 205 is also positioned within waveguide 203. In some examples, multi-functional DOE can be transmissive and redirect light, in additional to functioning as a lens element, as illustrated by light path A in FIG. 9. In some examples, multi-functional DOE can be reflective and redirect light, in additional to functioning as a lens element, as illustrated by light path B in FIG. 9. Similarly, waveguide output structure 205 may redirect light in transmission, as illustrated in FIG. 9, and/or waveguide output structure 205 may redirect light in reflection (not shown).

The artificial reality system 900 is similar to the artificial reality systems 500-800 of FIGS. 5-8, and illustrates that projector 148 and user's eye 510 can be on any side of the waveguide 203 relative to each other as well as relative to any of multi-functional DOE 502 and waveguide output structure 205. The example shown in FIG. 9 also illustrates that both multi-functional DOE 502 and waveguide output structure 205 can both be located anywhere within waveguide 203 or adjacent to either surface of waveguide 203 independently of each other.

Figure 10:
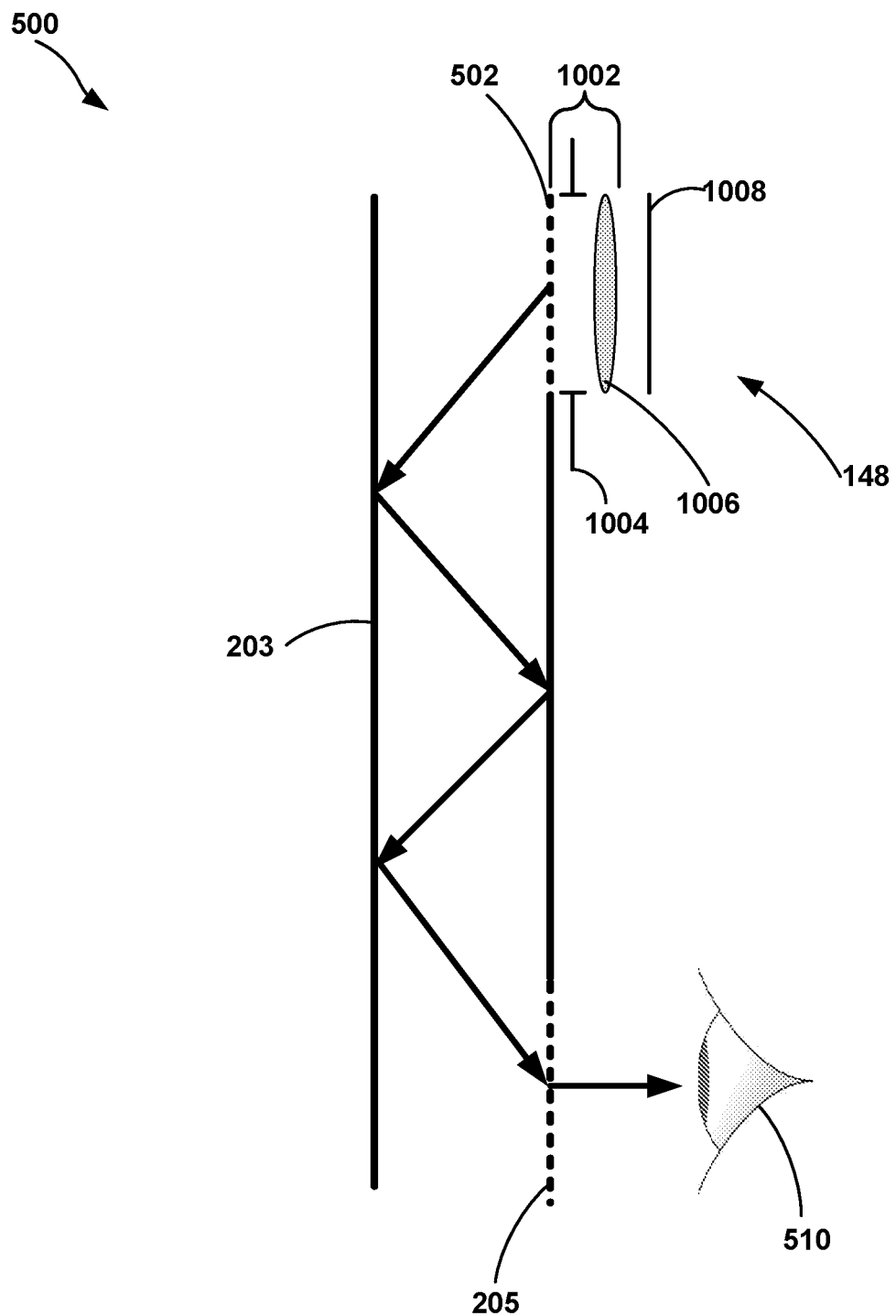
FIG. 10 is an illustration depicting a projection lens including a DOE in an artificial reality system, in accordance with the techniques described in this disclosure.

FIG. 10 is an illustration depicting a cross-sectional view of an example artificial reality system 500 that includes a multi-functional DOE 502, in accordance with the techniques described in this disclosure.

The example shown in FIG. 10 further illustrates details of the projection lens 1002. In the example shown, projector 148 includes a display 1008 and a projection lens 1002. Projection lens 1002 includes one or more lens elements 1006, a stop 1004, and multi-functional DOE 502. In the example shown, display 1008 is located at or near the focal plane of projector lens 1002, and light from display 1008 is collimated or substantially collimated.

Figure 11A:
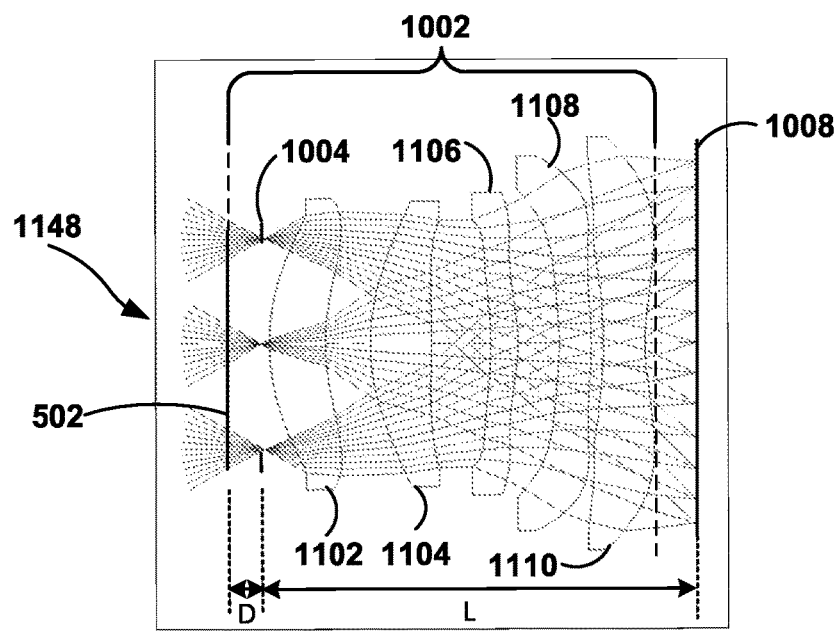
FIG. 11A is an illustration depicting a cross-sectional view of an example projector lens that includes a multi-functional DOE, in accordance with the techniques described in this disclosure.

FIG. 11A is an illustration depicting a cross-sectional view of an example projector 1148 that includes a multi-functional DOE 502, in accordance with the techniques described in this disclosure.

The example shown in FIG. 11A further illustrates details of the projection lens 1002. In the example shown, projector 1148 includes a display 1008 and projection lens 1002. Projection lens 1002 includes a plurality of lens elements 1102-1110, a stop 1004, and multi-functional DOE 502. In the example shown, display 1008 is located at or near the focal plane of projector lens 1002, and light from display 1008 is collimated or substantially collimated. The light is then redirected into a waveguide, for example waveguide 203 illustrated in FIGS. 5-10, by multi-functional DOE 502. The length of projector 1148 may be defined as the distance from stop 1004 to display 1008, and is denoted by L in the example shown. In some examples, the length L of projector 1148 may be less than 10 mm, and in other examples, the length L of projector 1148 may be less than 4 mm. The distance from stop 1004 to multi-functional DOE 502 is denoted by D in the example shown. In some examples, the distance D may be greater than 100 μm, and in other examples the distance D may be greater than 500 μm. In some examples, the distance D may be a negative value, e.g., multi-functional DOE 502 may be located between the exit pupil and first lens element 1102. The example shown also illustrates the focal positions of collimated light on display 1008 for light entering projector 1148 at multi-functional DOE 502, e.g., in the reverse direction, as an analog of the image projecting quality of projector 1148. In other words, the quality of projector 1148 in projecting an image may be evaluated by the image forming quality of projector 1148 at display 1008, e.g. the focal plane of projection lens 1002. In the example shown, the focal positions of a chief ray and two marginal rays, each for axially collimated light and off-axis collimated light at a plurality of off-axis angles, are illustrated in FIG. 11A.

Figure 11B:
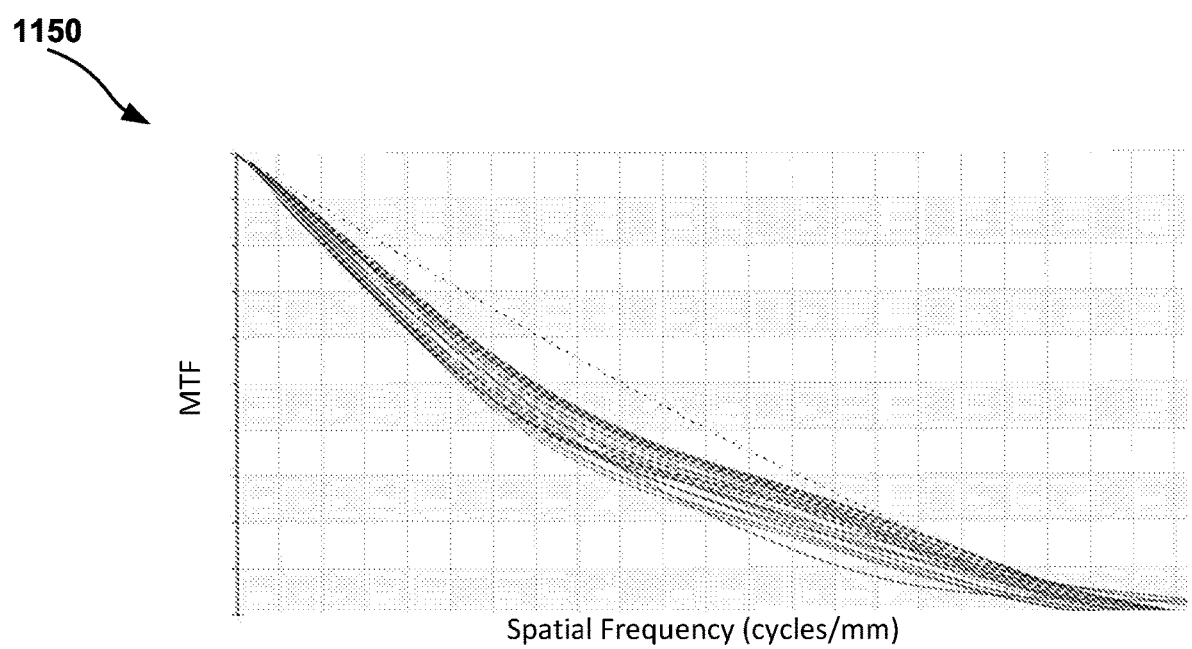
FIG. 11B is a plot of an example set of modulation transfer functions (MTFs) at various ray angles for the projection lens of FIG. 11A, in accordance with techniques described in this disclosure.

FIG. 11B is a plot 1150 of an example set of modulation transfer functions (MTFs) at various ray angles for an example projector 1148, in accordance with techniques described in this disclosure. In the example shown, plot 1150 illustrates the MTFs of projector 1150 including multi-functional DOE 502 for a set of rays at a plurality of off-axis angles and including an axial ray. The set of MTFs illustrated are for rays traced in the "reverse" direction, e.g., focusing rays in the plane of display 1008. The MTFs from this "reverse" ray trace correlate with the image projection quality of the projection lens in an AR system, e.g., the AR systems 600-900, e.g. via reversibility of light.

In some examples, multi-functional DOE 502 may improve the MTF of a projector, for example projector 1148, as compared with an equivalent projector that does not include multi-functional DOE 502. For example, an equivalent projector may include a projector of substantially the same length L and having the same number of optical elements, excepting multi-functional DOE 502, as compared with projector 1148, however, the shape and materials of the optical elements of such an equivalent projector may vary from projector 1148 because the equivalent projector would not include multi-functional DOE 1148. For example, the MTF values of projector 1148 may be higher on the y-axis at every spatial frequency along the x-axis as compared to the MTF values of an equivalent projector without multi-functional DOE 502.

In some examples, multi-functional DOE 502 improves the image projecting quality of projection lens 1002 by compensating for aberrations present in a projector which does not include multi-functional DOE 502. As such, multi-functional DOE 502 provides at least the advantage of improving the image projection quality of projection lens 1002, allows for reducing the length L of projector 1148 while maintaining the image projecting quality of projector 1148, or both. In some examples, multi-functional DOE 502 may enable the removal of a lens element, thereby reducing the weight and length of the lens.

In some examples, multi-functional DOE 502 may include a periodic phase profile to redirect light at an angle, e.g. a phase profile corresponding to a blazed grating, sinusoidal phase grating, square-wave phase grating, or any other type of periodic diffractive optical element. In addition, multi-functional DOE 502 may include a high order aberration correcting phase profile superimposed with the linear phase profile, for example, to both correct aberrations of the other optical elements of projection lens 1002, e.g., elements 1102-1110, and to redirect light. For example, multi-functional DOE 502 may include a rotationally symmetric phase profile such as:

$$\varnothing(\rho) = \Sigma_{i=1}^{N} \rho^{2i} \qquad (1)$$

where $\phi$ is the phase, $\rho$ is the radial coordinate of multi-functional DOE 502, and N is an order? For example, for N=2, $\phi(\rho)$ is a phase profile that can compensate for defocus (e.g. via a $\rho^2$ term) and spherical aberration (e.g. via a $\rho^4$ term).

In some examples, multi-functional DOE 502 may include an additional phase profile that is not rotationally symmetric. For example, multi-functional DOE 502 may include a phase profile such as:

$$\varnothing(x,y) = -1 + \Sigma_{i=0}^{N} \Sigma_{j=0}^{N} x^i y^j \qquad (2)$$

In some examples, a rotationally symmetric and non-rotationally symmetric phase profile may be superimposed with the periodic phase profile of multi-functional DOE 502. In some examples, a linear phase term, e.g. adding tilt to the incident beam, may be additionally added to the phase profile of multi-functional DOE 502 as well. As such, in examples, multi-functional DOE 502 may be configured to provide higher order aberration correcting phase profiles and function to both correct for any aberration, e.g. higher order aberrations such as oblique and vertical astigmatism, vertical and oblique trefoil, vertical and horizontal coma, vertical and oblique quadrafoil, vertical and oblique secondary astigmatism, distortion, etc., as well as redirect light as a diffraction grating. In some examples, multi-functional DOE 502 may be configured to be equivalent to an aspheric lens with high order aspheric coefficients.

In some examples, multi-functional DOE 502 may enable the requirements of the other elements of the lens to be relaxed. For example, a lens design including multi-functional DOE 502 may include other lens elements that require less complex curvature and less aspherical curvature, thereby easing manufacturing tolerances of the lens. In addition, a lens design including multi-functional DOE 502 may relieve material requirements of the lens elements, e.g. specialty non-dispersive, highly dispersive, and/or high index materials as lens elements.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A head-mounted display (HMD) configured to output artificial reality content, comprising:
   a waveguide configured to receive input light and configured to output the received input light to an eyebox;
   a projector configured to input light into the waveguide, the projector comprising:
      a display;
      a projection lens; and
      a multi-functional diffractive optical element (DOE) configured to redirect light from the projector into the waveguide,
      wherein a length of the projector along its optical axis from a stop of the projection lens to the display is less than 4 mm,
      wherein the stop is positioned opposite the projection lens from a focal plane of the projection lens, wherein the stop is positioned between the multi-functional DOE and the projection lens.

2. The HMD of claim 1, wherein the multi-functional DOE includes a linear phase profile and a higher order aberration correcting phase profile.

3. The HMD of claim 2, wherein the multi-functional DOE includes a rotationally symmetric higher order aberration correcting phase profile and a non-rotationally symmetric phase profile.

4. The HMD of claim 3, wherein the multi-functional DOE is configured to compensate for the aberrations of the projection lens.

5. The HMD of claim 1, wherein the multi-functional DOE is positioned to within 500 mm of a stop of the projection lens.

6. The HMD of claim 5, wherein the multi-functional DOE is positioned adjacent to a major surface of the waveguide.

7. The HMD of claim 1, wherein the multi-functional DOE is a transmissive DOE or a reflective DOE.

8. A projection lens comprising:
   one or more lens elements having optical power and configured to collimate light emitted at or near a focal plane of the projection lens;
   a multi-functional diffractive optical element (DOE) comprising:
      a linear phase profile; and
      a higher order aberration correcting phase profile, wherein the higher order aberration correcting phase profile is configured to provide higher order aberration correction of light incident on the multi-functional DOE; and
   a lens stop positioned opposite the one or more lens elements from the focal plane and positioned between the multi-functional DOE and the one or more lens elements,
      wherein a length of the projection lens along its optical axis from the lens stop of the projection lens to a display is less than 4 mm.

9. The projection lens of claim 8, wherein the periodic phase profile is configured to redirect light incident on the multi-functional DOE into a waveguide.

10. The projection lens of claim 8, wherein the higher order aberration correcting phase profile is configured to compensate for the aberrations of a projection lens that is configured to direct light to the multi-functional DOE.

11. The projection lens of claim 8, wherein the higher order aberration correcting phase profile includes a rotationally symmetric higher order aberration correcting phase profile and a non-rotationally symmetric phase profile.

12. The projection lens of claim 8, wherein the multi-functional DOE comprises a transmissive DOE.

13. The projection lens of claim 8, wherein the multi-functional DOE comprises a reflective DOE.

14. The projection lens of claim 8, wherein the multi-functional DOE comprises a metasurface or a metamaterial.

15. A method of projecting an image, the method comprising:
   emitting light from an electronic display;
   collimating the emitted light via a projection lens;
   redirecting the collimated emitted light via a multi-functional DOE; and
   compensating for the aberrations of the projection lens via the multi-functional DOE,
      wherein a length of the projection lens along its optical axis from a stop of the projection lens to the electronic display is less than 4 mm,
      wherein the stop is positioned opposite the projection lens from the electronic display, wherein the stop is positioned between the multi-functional DOE and the projection lens.

16. The method of claim 15, wherein compensating for the aberrations of the projection lens includes inducing a rotationally symmetric phase delay profile and a non-rotationally symmetric phase delay profile to the wavefront of the collimated emitted light.

17. The method of claim 16, wherein the redirecting the collimated emitted light comprises redirecting the collimated emitted light into a waveguide.

18. The method of claim 17, further comprising:
   positioning the multi-functional DOE at a major surface of the waveguide.

19. The method of claim 15, further comprising:
positioning the multi-functional DOE within 500 mm from a stop of the projection lens.

20. The method of claim 15, further comprising:
positioning the multi-functional DOE within 4 mm from the electronic display.

21. A projector lens comprising:
one or more lens elements having optical power and configured to collimate light emitted at or near a focal plane of the projector lens;
a multi-functional diffractive optical element (DOE) comprising:
   a linear phase profile; and
   a higher order aberration correcting phase profile configured to provide higher order aberration correction to light incident on the multi-functional DOE; and
a lens stop positioned opposite the one or more lens elements from the focal plane and positioned between the multi-functional DOE and the one or more lens elements.

* * * * *